No. 697,322. Patented Apr. 8, 1902.
C. S. BUCKLIN.
CAN STEAMING MACHINE.
(Application filed May 15, 1901.)
(No Model.)

Witnesses
Chas. D. E. Coy
Hamilton D. Turner

Inventor
Charles S. Bucklin
by his Attorneys
Howson & Howson

THE NORRIS PETERS CO., PHOTO-LITHO., WASHINGTON, D. C.

UNITED STATES PATENT OFFICE.

CHARLES S. BUCKLIN, OF BALTIMORE, MARYLAND.

CAN-STEAMING MACHINE.

SPECIFICATION forming part of Letters Patent No. 697,322, dated April 8, 1902.

Application filed May 15, 1901. Serial No. 60,377. (No model.)

*To all whom it may concern:*

Be it known that I, CHARLES S. BUCKLIN, a citizen of the United States, and a resident of Baltimore, Maryland, have invented certain Improvements in Can-Steaming Machines, of which the following is a specification.

My invention relates to apparatus designed for subjecting cans to heat after they have received their contents and have been sealed, the apparatus which I have devised employing steam as the heating agent and being constructed with especial reference to utilizing the maximum amount of heat to be derived from the steam.

Figure 1:
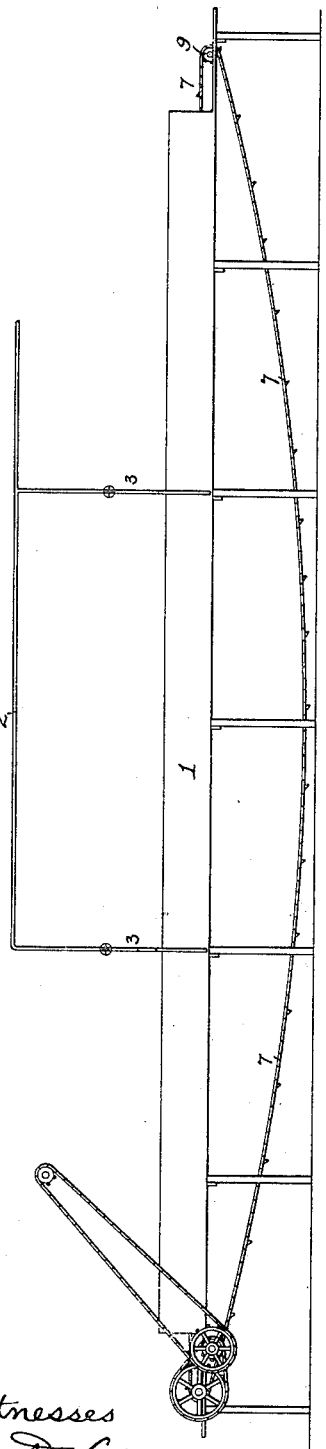
Figure 4:
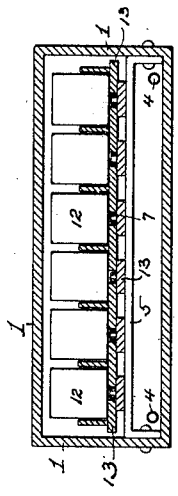
Figure 3:
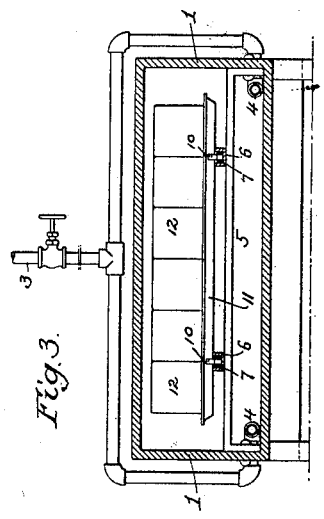
Figure 2:
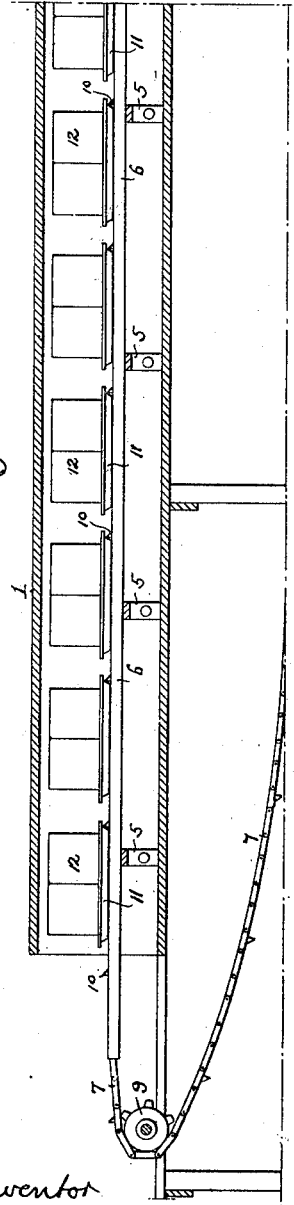

In the accompanying drawings, Figure 1 is a side view of apparatus for steaming cans constructed in accordance with my invention. Fig. 2 is a longitudinal section of part of the same on a larger scale. Fig. 3 is a transverse section, and Fig. 4 is a similar section of another form of the apparatus embodying my invention.

The apparatus comprises a long box or casing 1, mounted upon suitable supports and closed at top, bottom, and sides, but open at the ends, this box receiving its supply of steam at any desired point from a steam-pipe 2 and valved branches 3, the steam being by preference delivered into the box from perforated longitudinal pipes 4 at the lower corners of the same.

Within the box or casing 1 (shown in Figs. 1, 2, and 3) are a number of transverse bars 5, elevated above the bottom of the box and carrying a pair of longitudinally-grooved bars 6, which serve as channels for the support and guidance of the upper runs of a pair of endless chains 7, which are adapted to suitable sprocket-wheels 9 at the opposite ends of the casing 1, the shaft carrying the sprocket-wheels at one end of the casing having power applied to it in any suitable manner, so as to rotate said sprocket-wheels and cause the upper runs of the endless chains to traverse the casing 1 from end to end, the return run of the chains passing beneath the casing, as shown in Fig. 1. Each of the chains has projecting lugs or fingers 10, which project above the tops of the grooved bars 6, so as to act upon and move forwardly through the casing 1 the trays 11, which carry the filled cans 12, these trays resting upon and being supported by the upper edges of the grooved bars 6, so that the endless chains are entirely relieved from the weight of the same.

By mounting the grooved bars 6 upon elevated supports 5 in the casing 1 the cans 12 are caused to traverse said casing while supported close to the top of the same. Hence the maximum degree of heat from the steam will be imparted to the cans, and the endless chains and trays will be supported above any water of condensation which may collect in the casing.

Owing to the fact that the full heat of the steam is utilized in heating the cans the latter can be traversed through the casing more rapidly than usual. Hence the machine will have a maximum capacity in proportion to the amount of steam employed for heating it.

When the cans are not deposited in trays, I substitute for the grooved bars 6 a series of plates, such as shown at 13 in Fig. 4, in order to form a series of channels for guiding the cans, each of these channels having at the bottom a groove for the reception of a propelling-chain. In this case the use of projecting lugs upon the chains will not usually be necessary, as the projecting hinges between successive links of the chain will be sufficient to engage and push forward the cans. The term "supports for the cans" as used in the claims therefore is intended to cover either the construction which directly supports the cans or that which supports the can-carrying trays.

Having thus described my invention, I claim and desire to secure by Letters Patent—

1. A can-steaming machine comprising a box or casing open at the ends, steam-supplying pipes at the lower portion of the casing, means for moving the cans through the casing, and elevated supports for the can-carrier, so disposed that the cans during their travel will be maintained close to the top of the casing, substantially as specified.

2. A can-steaming machine comprising a box or casing open at the ends, pipes for supplying steam to the interior of said casing at the lower portion thereof, grooved longitudinal supports for the cans extending through the casing, and mounted above the bottom thereof, and endless chains running in said grooves and having projections extending above the tops of the same, substantially as specified.

In testimony whereof I have signed my name to this specification in the presence of two subscribing witnesses.

CHARLES S. BUCKLIN.

Witnesses:
JOHN M. RIFE,
H. J. BRANDAN.